United States Patent
Stock et al.

(10) Patent No.: US 11,613,274 B2
(45) Date of Patent: Mar. 28, 2023

(54) FALLBACK PROTECTION SYSTEM FOR PLATOONING SYSTEMS

(71) Applicant: ZF Active Safety GmbH, Koblenz (DE)

(72) Inventors: Nico Stock, Koblenz (DE); Niklas Roth, Neuwied (DE); David Schnitzler, Koblenz (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 282 days.

(21) Appl. No.: 16/918,062

(22) Filed: Jul. 1, 2020

(65) Prior Publication Data
US 2021/0009159 A1    Jan. 14, 2021

(30) Foreign Application Priority Data
Jul. 8, 2019  (DE) .................... 10 2019 118 365.0

(51) Int. Cl.
*B60W 30/09* (2012.01)
*B60W 30/16* (2020.01)
(Continued)

(52) U.S. Cl.
CPC ........ *B60W 60/0015* (2020.02); *B60W 30/09* (2013.01); *B60W 30/16* (2013.01);
(Continued)

(58) Field of Classification Search
CPC .. B60W 60/0015; B60W 30/09; B60W 30/16; B60W 50/0205; B60W 2420/42; B60W 2420/52; G08G 1/166; G08G 1/22
See application file for complete search history.

(56) References Cited

U.S. PATENT DOCUMENTS

2017/0287233 A1* 10/2017 Nix .................... G08G 1/166
2017/0344023 A1* 11/2017 Laubinger ........... B60W 30/165
(Continued)

FOREIGN PATENT DOCUMENTS

DE    102016209733       12/2017
JP    2015022423 A  *  2/2015
(Continued)

OTHER PUBLICATIONS

English Translation: Hashiguchi, JP 2015022423 A, Feb. 2, 2015, Japanese Patent Office Publication (Year: 2015).*
(Continued)

*Primary Examiner* — Nadeem Odeh
(74) *Attorney, Agent, or Firm* — Tarolli, Sundheim, Covell & Tummino LLP

(57) ABSTRACT

A fallback safety system for a vehicle equipped with a platooning system is configured to detect an operating state and a functional failure of the platooning system of the vehicle and to detect a distance of the vehicle to a vehicle driving in front with a sensor system of the vehicle. Further, in the case of a detected functional failure of the platooning system during a convoy driving operation of the vehicle controlled by the platooning system, the fallback safety system is configured to initiate braking of the vehicle and to adjust a braking acceleration of the vehicle during the initiated braking depending on the detected distance of the vehicle to the vehicle driving in front.

13 Claims, 3 Drawing Sheets

(51) Int. Cl.
  *B60W 60/00* (2020.01)
  *G08G 1/00* (2006.01)
  *B60W 50/02* (2012.01)
  *G08G 1/16* (2006.01)

(52) U.S. Cl.
  CPC ......... *B60W 50/0205* (2013.01); *G08G 1/166* (2013.01); *G08G 1/22* (2013.01); *B60W 2420/42* (2013.01); *B60W 2420/52* (2013.01)

(56) References Cited

U.S. PATENT DOCUMENTS

2018/0373268 A1* 12/2018 Antunes Marques Esteves .......... B60L 58/12
2020/0148229 A1* 5/2020 Meyer ................... B60W 30/09

FOREIGN PATENT DOCUMENTS

| WO | 2018043520 | 3/2018 | |
| WO | WO-2019110735 A1 * | 6/2019 | ............... B60T 7/00 |

OTHER PUBLICATIONS

English Translation: Gucker, WO 2019110735 A1, Jun. 13, 2019, WIPO Publication (Year: 2019).*

* cited by examiner

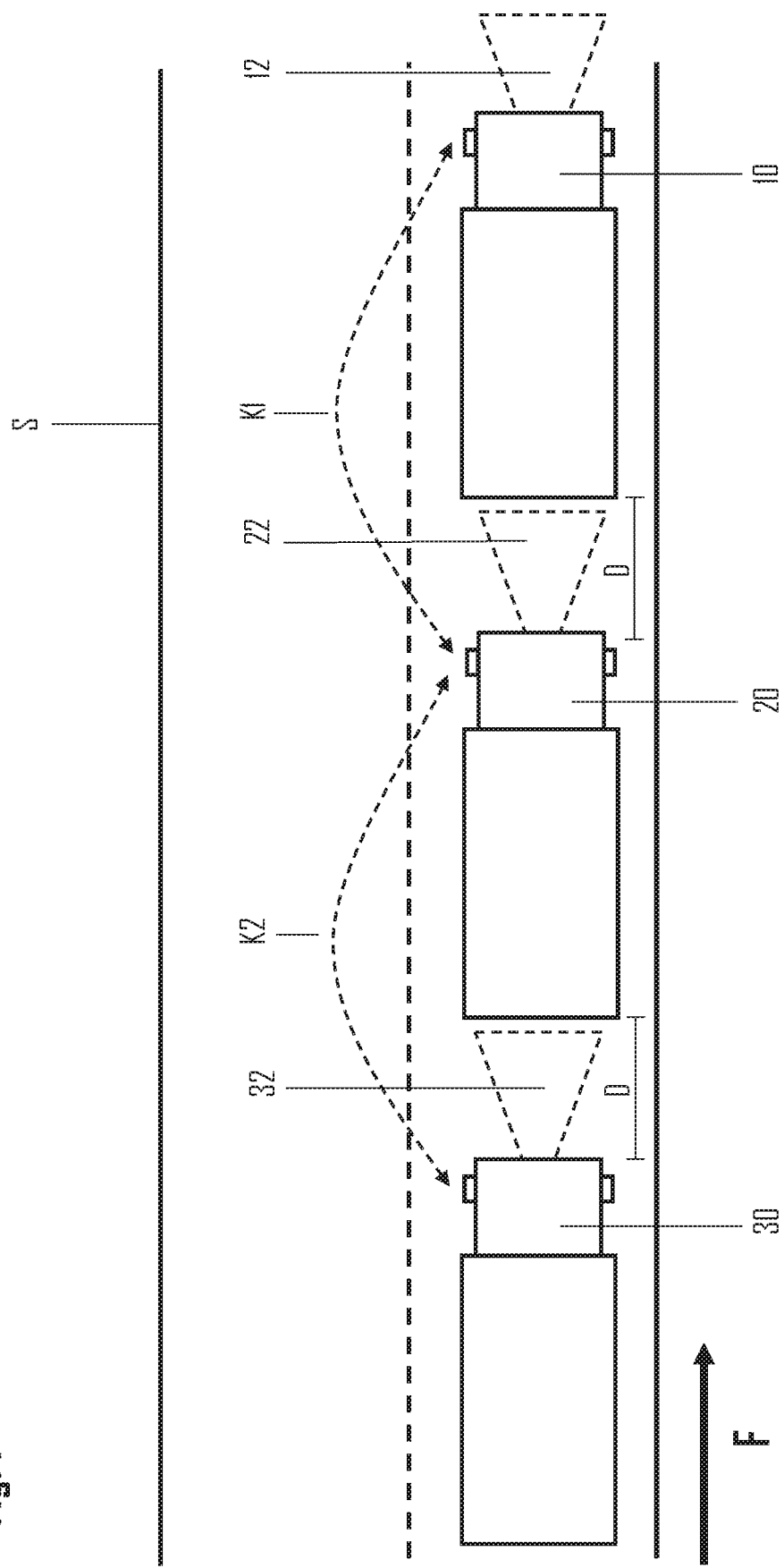

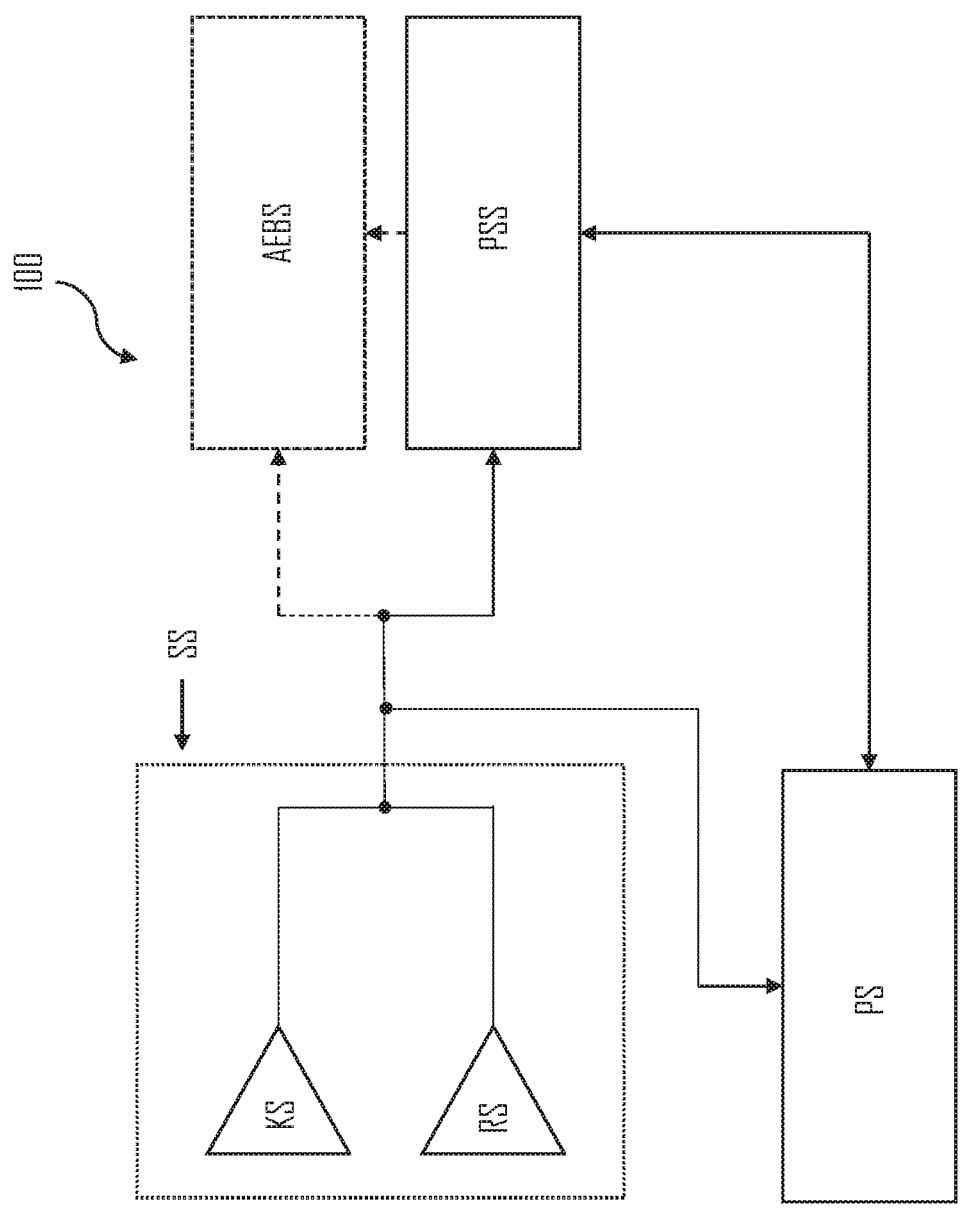

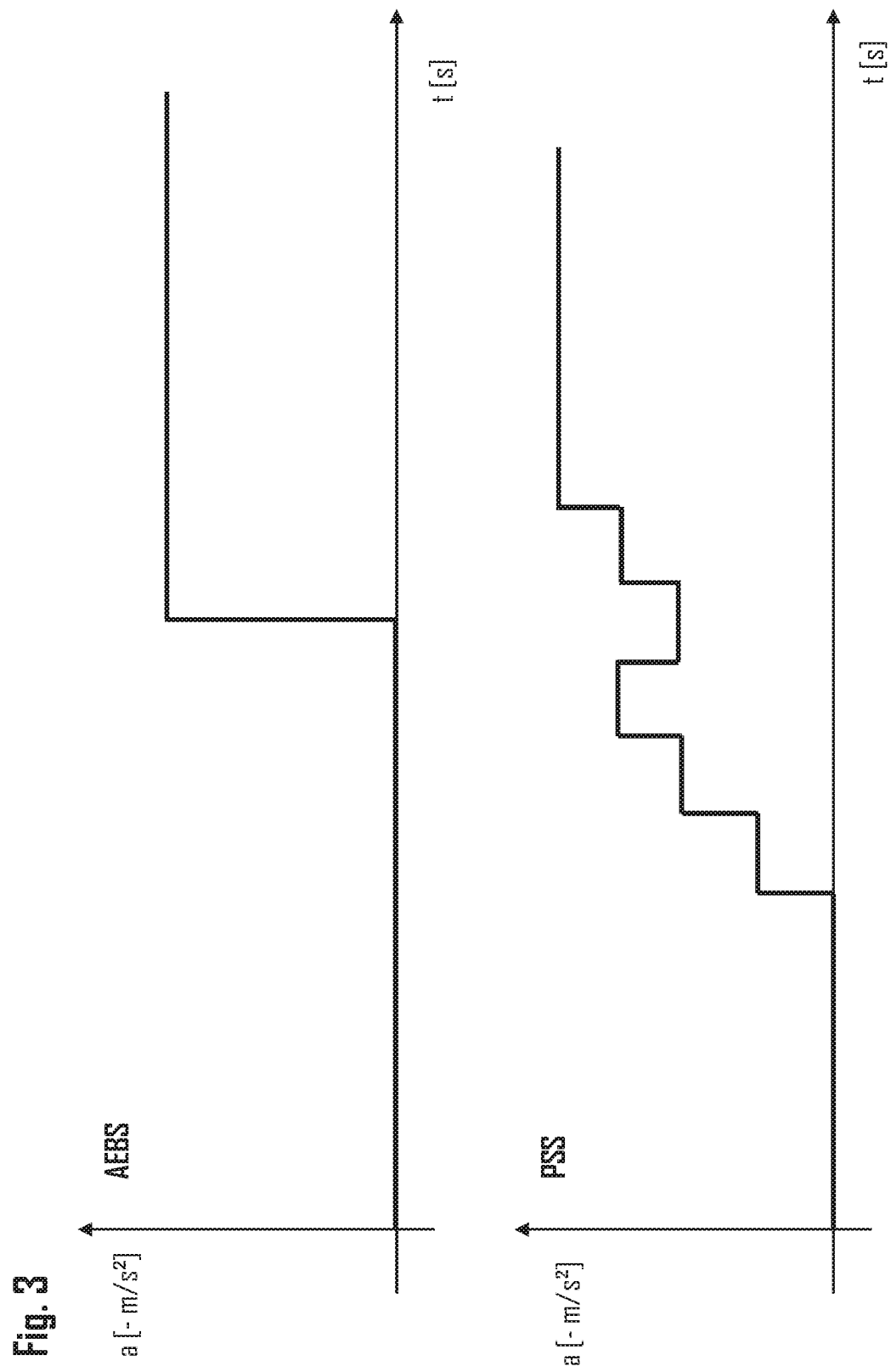

FALLBACK PROTECTION SYSTEM FOR PLATOONING SYSTEMS

Related Application

This application claims priority from German Application No. 10 2019 118 365.0 filed Jul. 8, 2019, the subject matter of which is incorporated herein by reference in its entirety.

BACKGROUND

A fallback protection system for platooning systems and an associated method are described herein.

Platooning in road traffic describes the driving of a plurality of vehicles, for example trucks, in a line with a small following distance using a special system—a so-called platooning system—for autonomous regulation of the distance between the vehicles. The vehicles following a lead vehicle are partially or completely controlled by the platooning system without the intervention of a vehicle driver. The platooning systems of the vehicles driving in a line communicate with each other by means of a radio signal (Car2Car communication) for the autonomous control of the vehicles and coordinate the control of the individual vehicles. This makes it possible for the individual vehicles of the line to drive at very close distances to each other or to drive very close together without touching or damaging each other.

If the platooning system of one or a plurality of motor vehicles malfunctions during such convoy driving operation, there is therefore a greatly increased risk of impact or collision between the previously autonomously guided vehicles in the line due to the short distances between the vehicles.

This risk is also increased by the automatic emergency braking assistants (AEB systems) which are usually installed in vehicles, especially trucks, and which initiate emergency or full braking of the vehicle if the distance to an obstacle in the driving direction is found to be below a minimum distance, which cannot be prevented or can only be partially prevented by the vehicle driver. Such full braking of a vehicle can be triggered immediately in the case of a failure of a platooning system in one or a plurality of vehicles in a line due to the very short distances between vehicles in the line at that time point. However, a full braking of a line vehicle represents a considerable accident risk for the following further line vehicles, which also follow the braking vehicle at a short distance.

Underlying Object

Despite the existence of systems (platooning systems) for autonomous vehicle control of vehicles driving in a line, in particular trucks, there is a need for an improved fallback safety system that reduces the accident risk in case of a failure of an activated control or platooning system of one or a plurality of motor vehicles of the line or convoy.

Suggested Solution

This technical object is solved by a control system according to claim 1, a vehicle according to claim 4 and a method according to claim 8. Advantageous embodiments are defined by the further claims.

A fallback safety system for a vehicle equipped with a platooning system, in particular a truck, is configured to detect an operating state and a functional failure of the platooning system of the vehicle and to detect a distance of the vehicle to a vehicle driving in front with a sensor system of the vehicle. Further, in the case of a detected functional failure of the platooning system during a convoy driving operation of the vehicle controlled by the platooning system, the fallback safety system is configured to initiate braking of the vehicle and to continuously or discontinuously adjust a braking acceleration of the vehicle during the initiated braking depending on the detected distance of the vehicle to the vehicle driving in front.

A braking acceleration here refers to a negative acceleration or a slowing down or retardation of the vehicle. In other words, it can be described that a braking acceleration is an acceleration of the vehicle against a current driving direction of the vehicle, which leads to a reduction of the vehicle speed.

For example, the fallback safety system may be configured to brake the vehicle initially at 25% of the maximum realizable braking acceleration and, depending on a further approach to the vehicle driving in front, to gradually increase the braking acceleration to 100% of the maximum realizable braking acceleration. The adaptation, i.e. the reduction or the increase of the braking acceleration, can occur at the end of a predetermined time interval, in particular a time interval of one second or a time interval of 10 milliseconds. In a variant, the fallback safety system may be configured to select a braking acceleration to be initiated from a predetermined number of predetermined braking accelerations depending on the detected distance of the vehicle from the vehicle driving in front. For example, seven different predefined braking accelerations can be initiated by the fallback safety system.

Optionally, in the case of a detected functional failure of the platooning system of the vehicle, the fallback protection system may initiate an acoustic and/or haptic and/or visual warning signal to the driver of the vehicle to draw his attention to the failure of the platooning system.

As soon as the distance to the vehicle driving in front has reached a predetermined distance, for example the legal distance minimum or 110% of the legal distance minimum, the braking of the vehicle can be terminated by the fallback safety system. The control, in particular the longitudinal control, of the vehicle may then be continued by the driver of the vehicle and/or another control system of the vehicle. Provided that the functionality of the platooning system of the vehicle is restored by the fallback safety system during braking of the vehicle, the control, in particular the longitudinal control, of the vehicle may be retransmitted to the platooning system and braking of the vehicle by the fallback safety system may be terminated.

An advantage here is firstly that the vehicle can be braked immediately after a failure of the platooning system, whereas an emergency braking assistant (AEBS—Advanced Emergency Braking System), which may also be installed in the vehicle, would only intervene and automatically brake the own vehicle if the distance to the vehicle driving in front fell below an absolute minimum distance. In particular, in the case of a functional failure of the platooning system that comes as a surprise to the driver of a line vehicle, the need for full braking can possibly still be avoided by the engagement of the fallback safety system, thereby reducing the probability of an accident, both for the own vehicle as well as for following vehicles.

A further advantage, however, is that by adjusting the braking acceleration, for example gradually or discontinuously, the reaction capability of the other vehicles following in the line or convoy at a short distance is improved in comparison to the full braking of one's own vehicle, which is particularly sudden.

The fallback safety system may further be adapted to deactivate an emergency braking assistant of the vehicle during convoy driving operation of the vehicle controlled by the platooning system and/or to activate the emergency braking assistant of the vehicle in case of a detected functional failure of the platooning system during convoy driving operation of the vehicle controlled by the platooning system, if the detected distance of the vehicle to the vehicle driving in front exceeds a predetermined distance. Optionally in addition to this—in return—the fallback safety system can be deactivated at least until a new convoy driving operation is started with the aid of the platooning system.

An advantage here is that a conventional emergency braking assistant (AEBS) can be installed in a vehicle in parallel with a fallback safety system, wherein mutual obstructions or utilization overlapping of the systems can be avoided.

Optionally, the fallback safety system can be implemented physically separated from the platooning system.

Further, the fallback safety system may use an energy supply that is physically separate from an energy supply of the platooning system, for example, a separate battery power supply.

An advantage here is that a technical error or a circumstance which causes a failure of the energy supply of the platooning system does not simultaneously affect the fallback safety system, which ensures a functional failure of the platooning system.

A functional failure of the platooning system can be detected by the fallback safety system, for example, by the absence of a continuous or quasi-continuous control signal to an actuator of the vehicle, which is continuously or quasi-continuously monitored by the fallback safety system. In other words, it can be described that the absence of a control signal or a control signal to be sent out regularly by the platooning system can be interpreted by the fallback safety system as a functional failure of the platooning system. Further, the platooning system is configured to detect an operating state of the platooning system, for example, whether the platooning system is currently activated or whether the platooning system is currently deactivated.

A vehicle comprises a platooning system configured to control autonomous convoy driving operation of the vehicle, a sensor system configured to determine a distance of the vehicle to a vehicle driving in front, and a fallback safety system configured to detect an operating state and a functional failure of the platooning system and to detect the distance of the vehicle to the vehicle driving in front determined by the sensor system. In this case, the fallback safety system is configured to initiate braking of the vehicle in the case of a detected functional failure of the platooning system during convoy driving operation of the vehicle controlled by the platooning system and to adjust a braking acceleration of the vehicle continuously or discontinuously depending on the detected distance of the vehicle to the vehicle driving in front.

For example, the sensor system may comprise a camera sensor and/or a radar sensor.

The individual sensors of the sensor system, which in one variant can also be formed by a single sensor, can be assigned exclusively to the fallback safety system for sole utilization or provide detection data to a plurality of vehicle control systems. For example, the fallback safety system and an emergency braking assistant (AEBS) also installed in the vehicle can use common sensors, wherein both the fallback safety system and the emergency braking assistant can be temporarily deactivated without affecting the functioning of the sensors.

In a variant, the vehicle may further comprise an emergency braking assistant which is configured to initiate emergency braking of the vehicle if the distance of the vehicle from a vehicle driving in front falls below a predetermined distance, wherein a braking acceleration of the vehicle during the initiated emergency braking corresponds to the maximum braking acceleration which can be achieved by the vehicle.

The fallback safety system may be configured to deactivate the emergency braking assist during convoy driving operation of the vehicle controlled by the platooning system. Further, the fallback safety system may be configured to activate the emergency braking assist in the case of a detected functional failure of the platooning system during convoy driving operation of the vehicle controlled by the platooning system, if the detected distance of the vehicle to the vehicle driving in front exceeds a predetermined distance.

The fallback safety system can be implemented physically separated from the platooning system. Further, the fallback safety system may have an energy supply that is physically separate from an energy supply of the platooning system, for example a separate battery power supply.

A method for braking a vehicle driving in an autonomous convoy driving operation controlled by a platooning system in case of a functional failure of the platooning system comprises the following steps:
  detecting the functional failure of the platooning system with a fallback safety system;
  determining a distance of the vehicle to a vehicle driving in front with a sensor system of the vehicle;
  initiating braking of the vehicle by the fallback safety system, wherein the fallback safety system continuously or discontinuously adjusts a braking acceleration of the vehicle depending on the detected distance of the vehicle to the vehicle driving in front.

Optionally, the method may further have at least one of the following steps:
  deactivating one of the vehicle's emergency braking assistants during convoy driving operation of the vehicle controlled by the platooning system;
  activating the vehicle's emergency braking assistant after the detected functional failure of the platooning system, if the detected distance of the vehicle to the vehicle driving in front exceeds a predetermined distance.

BRIEF DESCRIPTION OF THE DRAWINGS

Further objectives, features, advantages and application possibilities result from the following description of non-restrictive embodiments with reference to the corresponding drawings. Thereby, all described and/or pictorially depicted features, on their own or in any combination, show the object disclosed here, also independently of their grouping in the claims or their backward relations. The dimensions and proportions of the components shown in the drawings are explicitly not to scale.

FIG. 1 schematically shows an example of a vehicle line or a vehicle convoy controlled by a platooning system.

FIG. 2 schematically shows an example of the design and interaction of different control systems in a vehicle.

FIG. 3 shows qualitatively a discontinuous sequence of vehicle braking with a fallback safety system compared with the course of vehicle braking with an emergency braking system.

DETAILED DESCRIPTION OF THE DRAWINGS

Comparable or identical and equally effective components and features are marked with the same reference signs in the drawings. In some cases, reference signs of individual features and components have been omitted in the drawings for reasons of clarity, although these features and components are already provided with reference signs in other drawings. The components and features, which are not described again in relation to the further drawings are similar in their formation and function to the corresponding components and features according to the other drawings.

FIG. 1 shows an example of a line of trucks 10, 20, 30 moving on a road S in the driving direction F, wherein the trucks are each autonomously controlled by a platooning system. The individual platooning systems of the trucks 10, 20, 30 communicate with each other via the radio data connections K1, K2, which are established between the platooning systems. Depending on the variant of the platooning systems, there can be a serial connection between the respective platooning systems and/or a common radio network can be established, which allows the data exchange of a plurality of platooning systems with each other without binding serial assignment of the platooning systems.

In the example shown, the trucks 10, 20, 30 are spaced apart by a distance D during the operation of the platooning systems or during a line or convoy driving operation controlled by the platooning systems. In the driving situation shown in FIG. 1, the distance D corresponds to the distance traveled by one of the autonomously controlled trucks 10, 20, 30 within five hundred milliseconds.

Further, the trucks 10, 20, 30 shown in FIG. 1 each have a sensor system with optically detecting sensors and radar sensors, which are configured to detect a vehicle driving in front in a detection area 12, 22, 32 in front of their own vehicle and to determine a distance to this vehicle driving in front, which in the example shown corresponds to the distance D. The respective sensor systems of the shown trucks 10, 20, 30 provide the detected distance data each to a platooning system and a fallback safety system of the respective trucks.

FIG. 2 shows schematically and by way of example the control systems and sensors present in the trucks 10, 20, 30 and their interaction to form a vehicle control 100.

In the example shown, the sensor system SS comprises an optically detecting camera sensor KS and a radar sensor RS, each of which determines a distance to the vehicle driving in front, wherein the sensor system SS provides an average value of the distance determined by means of the camera sensor and radar sensor to the systems of the respective vehicle. The sensor system SS provides the average value of the distance of the vehicles determined by the sensors to the platooning system PS, the fallback safety system PSS (Platooning Safety System) as well as to an optionally available emergency braking assistant AEBS (Advanced Emergency Braking System). In other embodiments, a plurality of sensor systems can also be implemented, each of which provides distance data to the platooning system PS, the fallback safety system PSS and the optionally available emergency braking assistant AEBS, allowing the systems to operate independently of each other even in the case of the failure of a single sensor system.

The fallback safety system PSS, which in the example shown is implemented both physically and logically separately from the platooning system PS, monitors the functionalities of the platooning system PS. If the fallback safety system PSS detects a functional failure of the platooning system PS, the fallback safety system PSS in the example shown immediately initiates braking of the respective truck 10, 20, 30 by increasing the distance or range to the vehicle driving in front and establishing a sufficient safety distance from this vehicle. The extent of the braking acceleration or deceleration is adjusted by the fallback safety system PSS using the actual current distance D detected by the sensor system SS. Depending on whether the vehicle to be braked is moving further towards or away from the vehicle driving in front during the initiated braking course, the fallback safety system PSS gradually adjusts the braking acceleration of the vehicle. An increasing distance between the vehicles results in a decreasing braking acceleration and a decreasing distance between the vehicles results in an increasing braking acceleration. The fallback safety system PSS adapts the braking acceleration to be achieved discontinuously at the end of a predefined time interval.

The duration of this time interval depends on the specific embodiment of the fallback safety system PSS, which depends on the type of vehicle to be controlled (truck, car, etc.). The respective time interval can last for example one second, 500 milliseconds, 100 milliseconds, 50 milliseconds or 10 milliseconds.

Further, FIG. 2 shows an optional conventional emergency braking assistant AEBS installed in the respective trucks 10, 20, 30. If an emergency braking assistant is installed in the truck, it is deactivated during platooning or convoy driving operation in order to avoid unintentional triggering of an emergency braking by the emergency braking assistant AEBS due to the small distances between vehicles during platooning or convoy driving operation of the trucks 10, 20, 30 controlled by the respective platooning system PS and a resulting collision risk for the trucks following at a small distance. However, the fallback safety system PSS is configured to activate the optional emergency braking assistant AEBS, which is deactivated in the platooning or convoy driving operation, as soon as a sufficient safety distance, for example a distance of 110% of the legal minimum distance, between the own truck and the truck driving in front is established after a detected functional failure of the platooning system PS. This means that the fallback safety system PSS can activate an optional emergency braking assistant AEBS if the sensor system SS detects that a predetermined distance has been exceeded. Alternatively, the fallback safety system PSS can also transfer the (longitudinal) control of the truck back to the platooning system PS if a termination of a previously detected functional failure of the platooning system PS is detected by the fallback safety system PSS. If the fallback safety system PSS detects that a sufficient safety distance to the truck driving in front has been established by braking and/or that a functional failure of the platooning system PS has been terminated, the fallback safety system PSS causes the braking of the truck to be terminated. The driver of the truck can be informed of the termination of braking by the fallback safety system PSS by means of a visual and/or acoustic and/or haptic signal.

FIG. 3 shows an example of a qualitative course of a braking acceleration of a vehicle, which is braked in each case by a conventional braking assistant AEBS and a fallback safety system PSS. In contrast to a conventional braking assistant AEBS, the autonomous braking of a vehicle by means of the fallback safety system PSS already starts at comparatively large vehicle distances, wherein the braking acceleration is adjusted discontinuously (depending on the distance of the vehicle to be braked from a vehicle driving in front). A conventional emergency braking assistant AEBS, in contrast, is configured to initiate emergency braking independently of the driver of the vehicle only immediately before an anticipated collision with the vehicle driving in front or an obstacle, wherein the emergency braking is initiated by the emergency braking assistant in this case, however, immediately at the maximum possible braking acceleration.

The braking of a vehicle by means of the fallback safety system PSS instead of an emergency braking assistant AEBS, which may also be present in the same vehicle, is therefore advantageous in the special driving situation of a platooning or convoy driving operation or in a driving situation immediately prior to a dissolution of a platooning or convoy driving operation, since, firstly, the collision risk with a vehicle driving in front can be reduced by initiating braking comparatively earlier and, secondly, the discontinuously adjusted braking course can also reduce the collision risk for the line vehicles following at a short distance in this driving situation.

It is understood that the embodiments described above are not exhaustive and do not limit the object disclosed here. In particular, it is obvious to the person skilled in the art that it is possible to combine the described features in any way and/or to omit various features without deviating from the object disclosed here.

The invention claimed is:

1. A fallback safety system (PSS) for a vehicle (10, 20, 30) equipped with a platooning system (PS), the fallback safety system being configured to
    deactivate an emergency braking assistant (AEBS) of the vehicle (10, 20, 30) during convoy driving operation of the vehicle (10, 20, 30) controlled by the platooning system (PS),
    detect an operating state and a functional failure of the platooning system (PS) of the vehicle (10, 20, 30),
    detect with a sensor system (SS) of the vehicle (10, 20, 30) a distance (D) of the vehicle (10, 20, 30) to a preceding vehicle driving in front of the vehicle (10, 20, 30),
    activate the emergency braking assistant (AEBS) of the vehicle (10, 20, 30) in the case of the detected functional failure of the platooning system (PS) and during the convoy driving operation of the vehicle (10, 20, 30) controlled by the platooning system (PS), when the detected distance (D) of the vehicle (10, 20, 30) to the preceding vehicle driving ahead of the vehicle (10, 20, 30) exceeds a predetermined distance,
    cause the vehicle (10, 20, 30) to brake in response to the detected functional failure of the platooning system (PS) and during the convoy driving operation of the vehicle controlled by the platooning system (PS), and
    adjust a braking acceleration of the vehicle during induced braking depending on the detected distance (D) of the vehicle (10, 20, 30) to the preceding vehicle driving in front of the vehicle (10, 20, 30).

2. The fallback safety system (PSS) according to claim 1, wherein
    the fallback safety system (PSS) is implemented physically separated from the platooning system (PS).

3. The fallback safety system (PSS) according to claim 1, wherein
    the fallback safety system (PSS) uses an energy supply physically separated from an energy supply of the platooning system (PS).

4. The fallback safety system (PSS) according to claim 1, wherein the fallback safety system is configured to brake the vehicle until the detected distance of the vehicle to the preceding vehicle reaches a threshold value and the emergency braking assistant is configured to brake the vehicle once the detected distance of the vehicle to the preceding vehicle falls below the threshold value.

5. A vehicle having a platooning system (PS) configured to control an autonomous convoy driving operation of the vehicle, comprising:
    a sensor system (SS) configured to determine a distance (D) of the vehicle to a preceding vehicle driving in front of the vehicle (10, 20, 30);
    an emergency braking assistant (AEBS) configured to provide braking force corresponding to the maximum braking acceleration achievable by the vehicle;
    a fallback safety system (PSS) configured to detect an operating state and a functional failure of the platooning system (PS) and to detect the distance (D) of the vehicle to the preceding vehicle driving in front of the vehicle (10, 20, 30) as determined by the sensor system (SS), wherein
    the fallback safety system (PSS) is further configured to:
        deactivate the emergency braking assistant (AEBS) during a convoy driving operation of the vehicle controlled by the platooning system (PS),
        activate the emergency braking assistant (AEBS) in the case of the detected functional failure of the platooning system (PS) during the autonomous convoy driving operation of the vehicle controlled by the platooning system (PS), when the detected distance (D) of the vehicle to the preceding vehicle driving in front of the vehicle (10, 20, 30) exceeds a predetermined distance,
        initiate braking of the vehicle in response to the detected functional failure of the platooning system (PS) and during autonomous convoy driving operation of the vehicle controlled by the platooning system (PS), and
        adjust a braking acceleration of the vehicle depending on the detected distance (D) of the vehicle to the preceding vehicle driving in front of the vehicle (10, 20, 30).

6. The vehicle according to claim 5, wherein the sensor system (SS) comprises at least one of a camera sensor (KS and a radar sensor (RS).

7. The vehicle according to claim 6, wherein the emergency braking assistant (AEBS) configured to initiate emergency braking of the vehicle when the distance of the vehicle from the preceding vehicle driving in front of the vehicle (10, 20, 30) falls below the predetermined distance.

8. The vehicle according to claim 5, wherein the emergency braking assistant (AEBS) is configured to initiate emergency braking of the vehicle when the distance of the vehicle from the preceding vehicle driving in front of the vehicle (10, 20, 30) falls below the predetermined distance.

9. The vehicle according to claim 5, wherein
    the fallback safety system (PSS) is implemented physically separated from the platooning system (PS).

10. The vehicle according to claim 5, wherein
    the fallback safety system (PSS) has an energy supply physically separated from an energy supply of the platooning system (PS).

11. The vehicle according to claim 5, wherein the fallback safety system brakes the vehicle until the detected distance of the vehicle to the preceding vehicle reaches a threshold value and the emergency braking assistant brakes the vehicle once the detected distance of the vehicle to the preceding vehicle falls below the threshold value.

12. A method for braking a vehicle (10, 20, 30) driving in an autonomous convoy operation controlled by a platooning system (PS) in the case of a functional failure of the platooning system (PS), the method comprising:

deactivating an emergency braking assistant (AEBS) of the vehicle (10, 20, 30) during an autonomous convoy driving operation of the vehicle (10, 20, 30) controlled by the platooning system (PS);

detecting the functional failure of the platooning system (PS) with a fallback safety system (PSS);

determining a distance (D) of the vehicle (10, 20, 30) to a preceding vehicle driving in front of the vehicle (10, 20, 30) with a sensor system (SS) of the vehicle (10, 20, 30);

activating the emergency braking assistant (AEBS) of the vehicle (10, 20, 30) after the detected functional failure of the platooning system (PS) and during the convoy driving operation of the vehicle (10, 20, 30) when the detected distance (D) of the vehicle (10, 20, 30) to the preceding vehicle driving in front of the vehicle (10, 20, 30) exceeds a predetermined distance;

initiating braking of the vehicle (10, 20, 30) by the fallback safety system (PSS) and separate from the emergency braking assistant (AEBS), wherein the fallback safety system (PSS) adjusts a braking acceleration of the vehicle (10, 20, 30) depending on the detected distance (D) of the vehicle (10, 20, 30) to the preceding vehicle driving in front of the vehicle (10, 20, 30).

13. The method according to claim 12, wherein the fallback safety system brakes the vehicle until the detected distance of the vehicle to the preceding vehicle reaches a threshold value and the emergency braking assistant brakes the vehicle once the detected distance of the vehicle to the preceding vehicle falls below the threshold value.

* * * * *